US009467276B2

(12) United States Patent
Wei

(10) Patent No.: US 9,467,276 B2
(45) Date of Patent: Oct. 11, 2016

(54) COMMUNICATION METHOD FOR PERFORMING DYNAMIC RADIO DORMANT MECHANISM

(71) Applicant: ACER INCORPORATED, New Taipei (TW)

(72) Inventor: Hung-Yu Wei, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 127 days.

(21) Appl. No.: 14/507,212

(22) Filed: Oct. 6, 2014

(65) Prior Publication Data

US 2015/0109975 A1 Apr. 23, 2015

Related U.S. Application Data

(60) Provisional application No. 61/894,138, filed on Oct. 22, 2013.

(51) Int. Cl.
| | | |
|---|---|---|
| H04W 72/04 | (2009.01) | |
| H04W 88/08 | (2009.01) | |
| H04L 5/00 | (2006.01) | |
| H04L 5/14 | (2006.01) | |
| H04W 72/12 | (2009.01) | |
| H04W 52/02 | (2009.01) | |
| H04W 8/24 | (2009.01) | |

(52) U.S. Cl.
CPC ............ H04L 5/14 (2013.01); H04W 52/0238 (2013.01); H04W 72/1263 (2013.01); H04W 8/24 (2013.01)

(58) Field of Classification Search
CPC H04W 72/042; H04W 88/08; H04L 5/0053; H04L 5/0094
USPC ......................................... 370/280
See application file for complete search history.

(56) References Cited

U.S. PATENT DOCUMENTS

2010/0061326 A1* 3/2010 Lee ................. H04W 88/06
370/329
2012/0113844 A1 5/2012 Krishnamurthy

FOREIGN PATENT DOCUMENTS

| CN | 102333378 A | 1/2012 |
|---|---|---|
| CN | 103201970 A | 7/2013 |

* cited by examiner

*Primary Examiner* — Ronald B Abelson
(74) *Attorney, Agent, or Firm* — Birch, Stewart, Kolasch & Birch, LLP

(57) ABSTRACT

A communication method for a communication station to transmit time division duplex frames includes transmitting a capability of supporting a dynamic radio dormant mechanism to one or more communication devices; collecting at least one of a traffic information, an energy policy, an energy status and an interference policy for determining whether one or more predetermined dormant criteria are met; transmitting one or more signaling messages to the one or more communication devices to perform the dynamic radio dormant mechanism; and stopping at least one of a transmission of a downlink traffic in a downlink subframe configured to be dormant and a reception of an uplink traffic in an uplink subframe configured to be dormant. Each of the time division duplex frames comprises a plurality of subframes.

20 Claims, 5 Drawing Sheets

COMMUNICATION METHOD FOR PERFORMING DYNAMIC RADIO DORMANT MECHANISM

CROSS-REFERENCE TO RELATED APPLICATIONS

This application claims the benefit of priority to U.S. Provisional Application Ser. No. 61/894,138, filed on Oct. 22, 2013; the entirety of which is incorporated herein by reference for all purposes.

BACKGROUND

The disclosure generally relates to a communication system and, more particularly, to the communication system with the dynamic radio dormant mechanism.

Nowadays, the prevalence of the mobile communications has brought people so much convenience, but, on the other hand, also brought more challenges to the network operators. For example, in order to enhance the communication performance, the network operators have to deploy many base stations for serving the increasing number of users and for providing more communication bandwidth. However, the interferences between the base stations become more severe as more base stations are deployed, and limit the enhancement of the communication performance.

Moreover, as the number of the deployed base stations increases, the enormous power consumption of the base stations becomes a burden to the network operators. On the users' side, there is always the demand for reducing the power consumption of the user equipment (e.g., mobile phones and portable computing devices) to extend the operation time of the user equipment.

The traffic in the base station may adaptively vary but the base station must transmit reference signals or try listing to the communication device when there is only less traffic or even no associated communication device. Especially, when more and more small-cell base stations are deployed in the communication system, the situations happen more frequently. Although some techniques, such as the discontinuous reception (DRX) and turning off the entire base station, have already been adopted, as the communication technology evolves, more elaborated techniques may be utilized to further reduce the impacts mentioned above.

SUMMARY

In view of the foregoing, it may be appreciated that a substantial need exists for methods and apparatuses that mitigate or reduce the problems above.

An example embodiment of a communication method for a communication station to transmit time division duplex frames wherein each TDD frames comprises a plurality of subframes is disclosed, comprising: transmitting a capability of supporting a dynamic radio dormant mechanism to one or more communication devices; collecting at least one of a traffic information, an energy policy, an energy status and an interference policy for determining whether one or more predetermined dormant criteria are met; transmitting one or more signaling messages to the one or more communication devices to perform the dynamic radio dormant mechanism; and stopping at least one of a transmission of a downlink traffic in a downlink subframe configured to be dormant and a reception of an uplink traffic in an uplink subframe configured to be dormant.

Another example embodiment of a communication method for a communication station to transmit frequency division duplex frames is disclosed, comprising: transmitting a capability of supporting a dynamic radio dormant mechanism to one or more communication devices; collecting at least one of a traffic information, an energy policy, an energy status and an interference policy for determining whether one or more predetermined dormant criteria are met; transmitting one or more signaling messages to the one or more communication devices to perform the dynamic radio dormant mechanism; and stopping at least one of a transmission of a downlink traffic in a downlink frame configured to be dormant and a reception of an uplink traffic in an uplink frame configured to be dormant.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
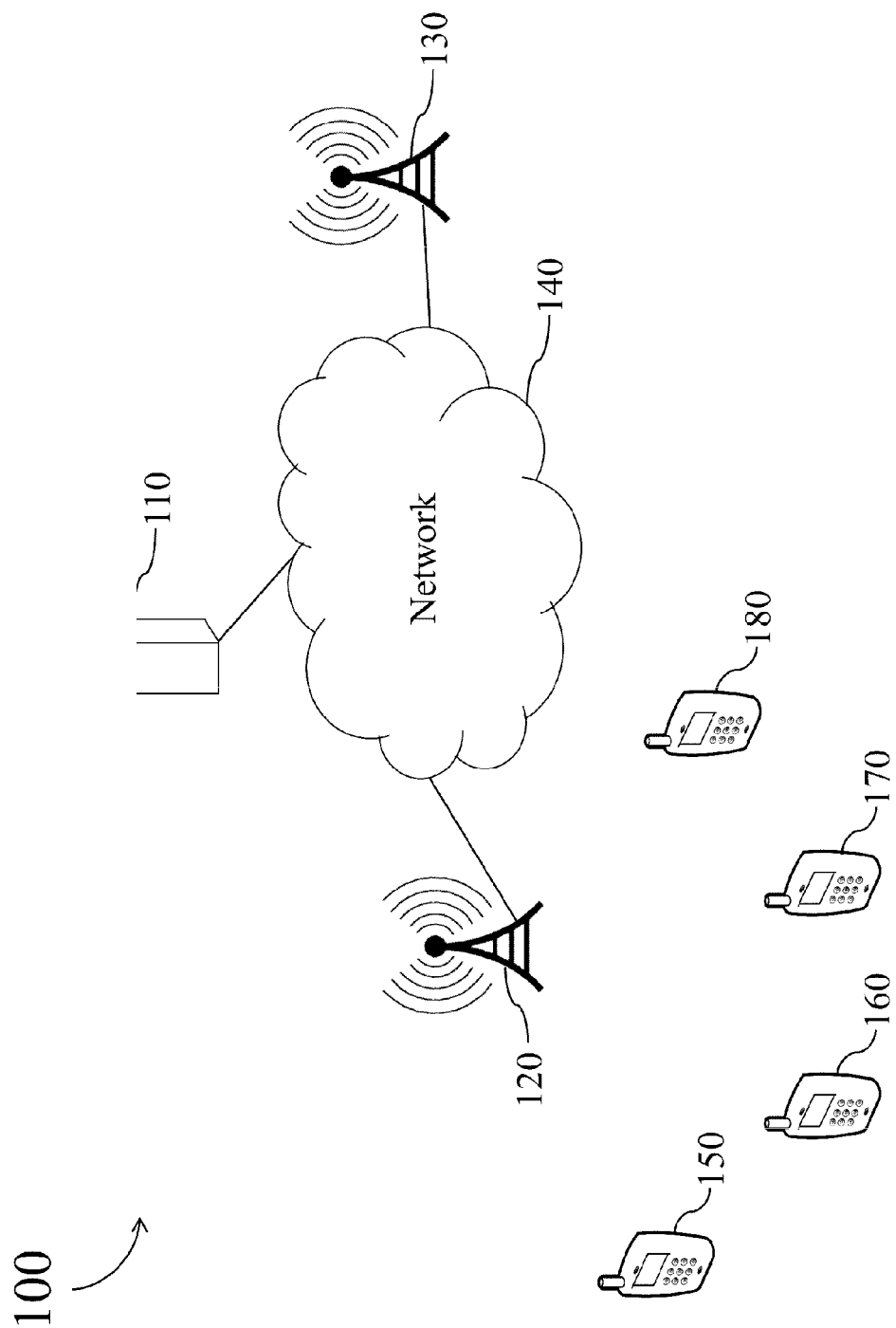
FIG. 1 shows a simplified schematic diagram of a communication system according to one embodiment of the present disclosure.

FIG. 1 shows a simplified schematic diagram of a communication system 100 according to one embodiment of the present disclosure. In this embodiment, the communication system 100 comprises a network controlling entity 110, communication stations 120 and 130, a network 140 and communication devices 150, 160, 170 and 180. For the purposes of conciseness and clear explanation, some components and connections of the communication system 100 are not shown in FIG. 1.

The network controlling entity 110 may be realized with a self organizing network (SON) server, a mobility management entity (MME), a radio network controller (RNC) or other suitable network controller for configuring the behavior of the communication stations 120 and 130.

The communication stations 120 and 130 may be respectively realized with a node B (NB), an evolved NB (eNB), home eNB, base station (BS), macrocell BS, macrocell BS, picocell BS, femtocell BS, etc.

The network 140 may be realized with one or more wired networks and/or wireless networks, and may comprise one or more backhaul networks, one or more core networks, one or more gateways, etc. for connecting the network controlling entity 110, the communication station 120 and the communication station 130

The communication devices 150, 160, 170 and 180 may be respectively realized with a mobile phone, a tablet computer, other suitable user equipment (UE), etc.

In this embodiment, the communication devices 150, 160, 170 and 180 are associated with the communication station 120.

The communication system 100 may perform the dynamic radio dormant mechanism for reducing the power consumption and the interferences between the communication stations.

Figure 2:
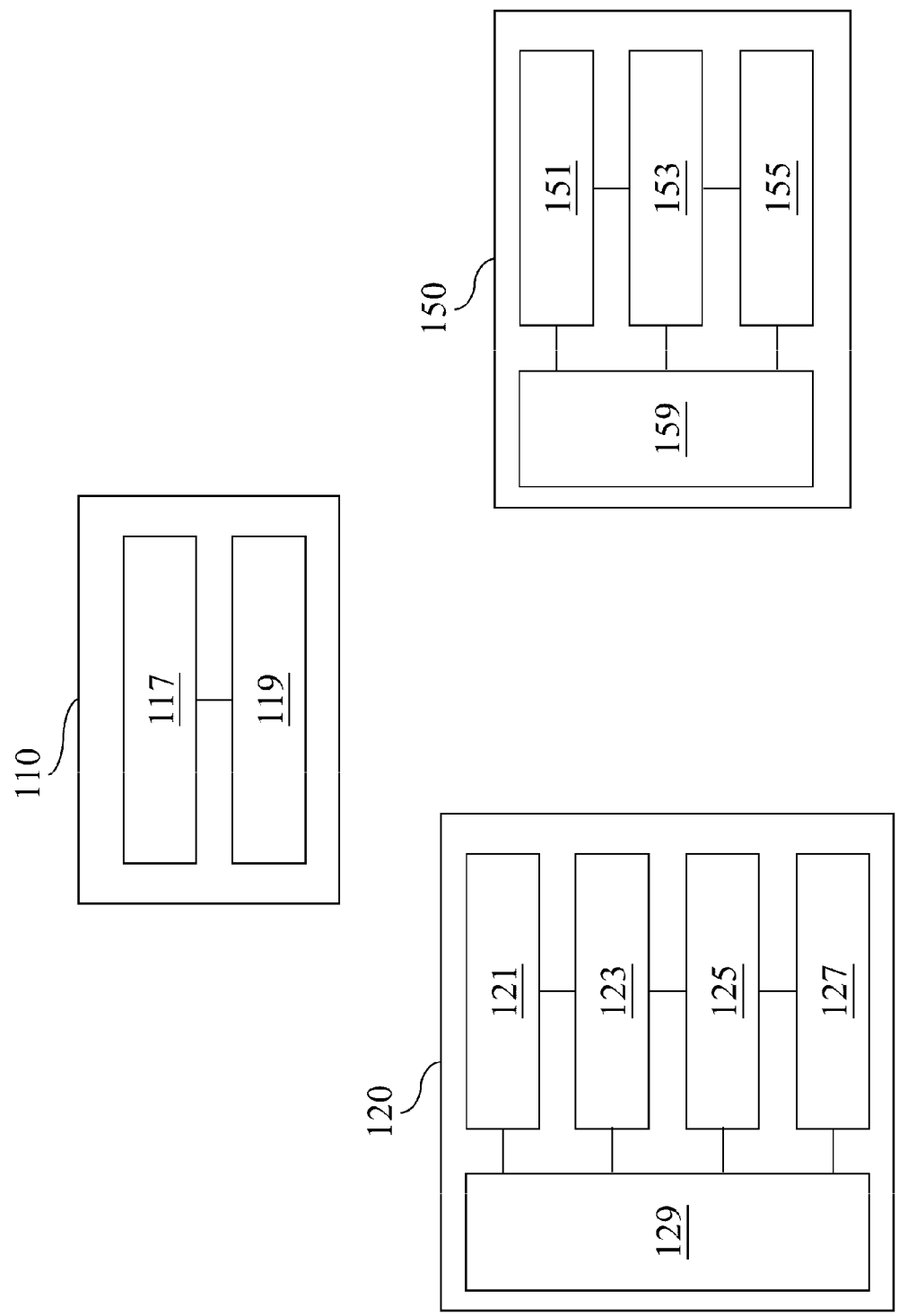
FIG. 2 shows a simplified functional block diagram of some components in the communication system in FIG. 1 according to one embodiment of the present disclosure.

FIG. 2 shows a simplified functional block diagram of some components in the communication system 100 in FIG. 1 according to one embodiment of the present disclosure.

In this embodiment, the network controlling entity 110 comprises a transceiving circuit 117 and a control circuit 119. The transceiving circuit 117 is utilized to couple with the network 140 for performing communications with the communication stations 120 and 130. The control circuit 119 may be realized with a processor, analog circuit elements and/or digital circuit elements for controlling the operations of the transceiving circuit 117.

The communication station 120 comprises an antenna 121, a radio frequency (RF) processing circuit 123, a baseband processing circuit 125, a transceiving circuit 127 and a control circuit 129. The RF processing circuit 123 converts radio signals received from the antenna 121 into baseband signals for transmitting to the baseband processing circuit 125, and converts baseband signals received from the baseband processing circuit 123 into radio signals for transmitting through the antenna 121. The RF processing circuit 123 may comprise an oscillating circuit, a mixing circuit, a power amplifier circuit, etc. The baseband signal processing circuit 125 generates modulated signals for transmitting to the RF processing circuit 123 and demodulates signals received from the RF processing circuit 123. The baseband signal processing circuit 125 may comprise error correction code encoder and decoder, scrambler and descrambler, filter circuit, etc. for performing modulation operations and demodulation operations. The transceiving circuit 127 is utilized to couple with the network 140 for performing communications with the network controlling entity 110 and the communication station 130. The control circuit 129 may be realized with a processor, analog circuit elements and/or digital circuit elements for controlling the operations of the RF processing circuit 123, the baseband processing circuit 125 and the transceiving circuit 127.

The communication device 150 comprises an antenna 151, an RF processing circuit 153, a baseband processing circuit 155 and a control circuit 159. The RF processing circuit 153 converts radio signals received from the antenna 151 into baseband signals for transmitting to the baseband processing circuit 155, and converts baseband signals received from the baseband processing circuit 153 into radio signals for transmitting through the antenna 151. The RF processing circuit 153 may comprise an oscillating circuit, a mixing circuit, a power amplifier circuit, etc. The baseband signal processing circuit 155 generates modulated signals for transmitting to the RF processing circuit 153 and demodulates signals received from the RF processing circuit 153. The baseband signal processing circuit 155 may comprise error correction code encoder and decoder, scrambler and descrambler, filter circuit, etc. for performing modulation operations and demodulation operations. The control circuit 159 may be realized with a processor, analog circuit elements and/or digital circuit elements for controlling the operations of the RF processing circuit 153 and the baseband processing circuit 155.

The communication station 130 may be realized with a structure same as or similar to the communication station 120. The communication devices 160, 170 and 180 may be respectively realized with a structure same as or similar to the communication device 150. Relevant descriptions are therefore omitted for conciseness.

Figure 3:
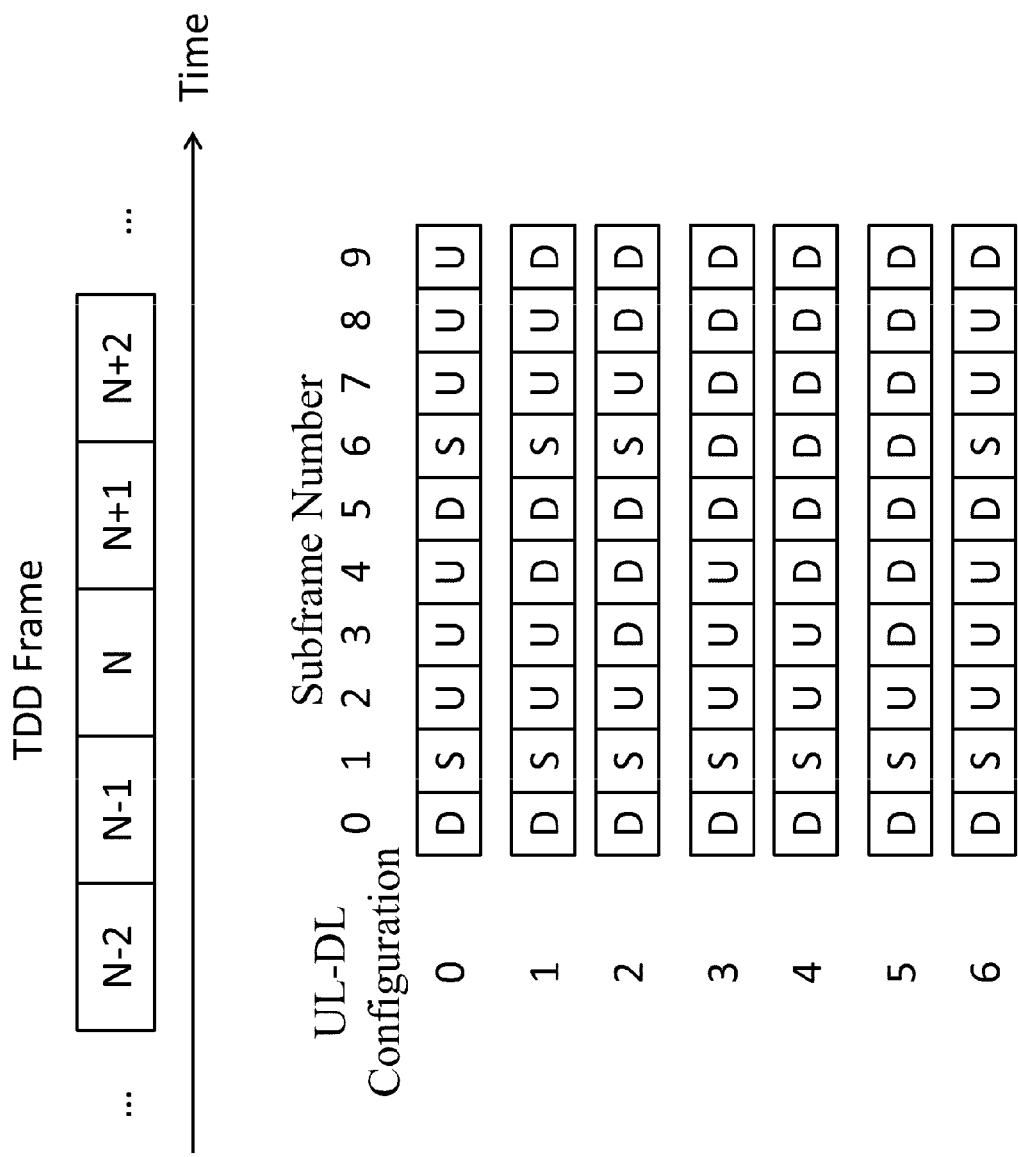
FIG. 3 shows a simplified schematic diagram of the uplink-downlink resource assignments in different uplink-downlink configurations in a time division duplex communication system according to one embodiment of the present disclosure.

FIG. 3 shows a simplified schematic diagram of the uplink-downlink (UL-DL) resource assignments in different UL-DL configurations in a time division duplex (TDD) communication system according to one embodiment of the present disclosure.

When the communication system 100 operates in the TDD mode, the frames transmitted between the communication station and the communication device are illustrated in the upper part of FIG. 3. In this embodiment, a TDD frame comprises ten subframes (numbered from 0 to 9) and each subframe may be configured to be an uplink subframe (denoted as U in FIG. 3), a downlink subframe (denoted as D in FIG. 3) or a special subframe (denoted as S in FIG. 3) as illustrated in the lower part of FIG. 3. The communication station and the communication device may perform communications with a suitable UL-DL configuration according to different application considerations.

The uplink subframe is utilized for the communication device to transmit the uplink traffic to the communication station. The term "traffic" is utilized to mention the data and/or the signaling transmitted between the communication station and the communication device. The downlink subframe is utilized for the communication station to transmit the downlink traffic to the communication device. The special subframe is positioned between the downlink subframe and the uplink subframe. A first partition of the special subframe may be utilized to transmit the downlink traffic. A second partition of the special subframe may be utilized as a guard period reserved for switching from the downlink subframe to the uplink subframe. The last partition of the special subframe may be utilized to transmit the uplink traffic.

Furthermore, when utilizing the dynamic radio dormant mechanism, the subframes may be categorized into two types, i.e., the configurable subframes and the static subframes.

The configurable subframes may be configured to be dormant or non-dormant. The configurable subframes comprise the configurable uplink subframes and the configurable downlink subframes. When a configurable uplink subframe is configured to be dormant, the communication station does not receive the uplink traffic in the configurable uplink subframe. When a configurable uplink subframe is configured to be non-dormant, it is utilized as a normal uplink subframe. When a configurable downlink subframe is configured to be dormant, the communication station does not transmit the downlink traffic in the configurable downlink subframe. When a configurable downlink subframe is configured to be non-dormant, it is utilized as a normal downlink subframe.

The static subframes comprise the static uplink subframes and the static downlink subframes. A static uplink subframe may only be configured to be non-dormant so that the communication station always may receive the uplink traffic in the static uplink subframe. A static downlink subframe may only be configured to be non-dormant so that the communication station always may transmit the downlink traffic in the static downlink subframe.

When there is less uplink traffic between the communication station 120 and the serving communication devices, one or more uplink subframes may be configured to be dormant. When there is less downlink traffic between the communication station 120 and the serving communication devices, one or more downlink subframes may be configured to be dormant. The communication station may configure only the downlink subframe(s) to be dormant, only the uplink subframe(s) to be dormant, or both the uplink subframe(s) and the downlink subframe(s) to be dormant according to different design considerations.

Moreover, the dynamic radio dormant mechanism may cooperate with other technique for providing better communication performance, e.g., the selection of a suitable UL-DL configuration. When there is less uplink traffic between the communication station 120 and the serving communication devices, the UL-DL configuration with fewer uplink subframes may be chosen and one or more uplink subframes may be configured to be dormant. When there is less downlink traffic between the communication station 120 and the serving communication devices, the UL-DL configuration with fewer downlink subframes may be chosen and one or more downlink subframes may be configured to be dormant.

In other embodiments, instead of respectively configuring each subframe to be dormant, the subframes may also be grouped into one or more predetermined subframe-sets. For example, the subframes 1 and 5 may be grouped into one subframe-set, and the communication station configures the subframes in the subframe-set to be dormant or not dormant together. In other embodiments, the subframes may be grouped into one or configurable subframe-set(s) and the static subframe-set, and the communication station configures one or more subframes to be dormant from the configurable subframe-set(s).

Figure 4:
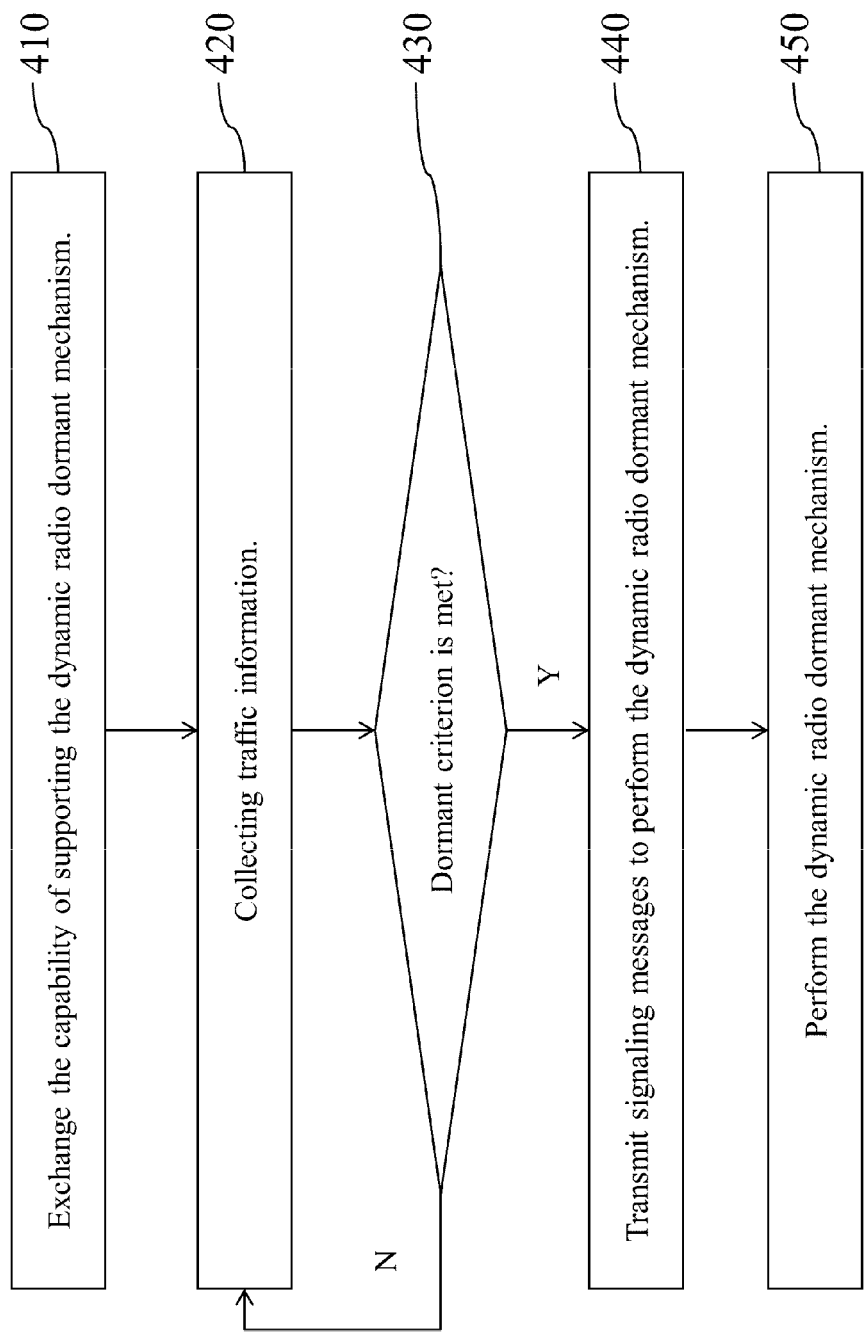
FIG. 4 shows a simplified flowchart of a communication method according to one embodiment of the present disclosure.

FIG. 4 shows a simplified flowchart of a communication method according to one embodiment of the present disclosure. In the embodiment in FIG. 4, the communication method illustrates the operations between the communication station 120 and the communication devices performing the dynamic radio dormant mechanism in the TDD mode.

In the operation 410, the communication station 120 and the communication device perform the association process. The communication station 120 and the communication device may exchange the capability of supporting the dynamic radio dormant mechanism in the association process. For example, the control circuit 129 of the communication station 120 may configure the baseband processing circuit 125, the RF processing circuit 123 and the antenna 121 to periodically transmit the capability to support the dynamic radio dormant mechanism by utilizing the system information block (SIB). The SIB may comprise an indicator to indicate whether the communication station supports the dynamic radio dormant mechanism, an indicator to indicator whether the dynamic radio dormant mechanism is currently enabled, an indicator to indicator whether the configuration of the dynamic radio dormant mechanism is to be changed, etc. In other embodiments, the SIB may comprise a pointer pointed to the detailed configuration of the dynamic radio dormant mechanism (e.g., the detailed configuration may be located in another SIB). For example, the detailed configuration may comprise the subframe(s) configured to be dormant, a mapping table indicating the subframe(s) configured to be dormant, etc. The control circuit of the communication device may also configure the baseband processing circuit, the RF processing circuit and the antenna to report its capability of supporting the dynamic radio dormant mechanism to the communication station 120 in the association process.

In the operation 420, the control circuit 129 of the communication station 120 collects traffic information by utilizing the antenna 121, the RF processing circuit 123 and the baseband processing circuit 125 for determining whether the dynamic radio dormant mechanism should be utilized. The traffic information may comprise the traffic status between the communication station 120 and the serving communication devices, the interference condition from the neighboring communication station(s) (e.g., the communication station 130 in this embodiment), etc. The traffic status may comprise the uplink traffic rate, the downlink traffic rate, the downlink traffic in the queue, the buffer status reported by the communication devices.

In the operation 430, the control circuit 129 of the communication station 120 determines whether the dynamic radio dormant mechanism should be utilized according to the collected traffic information. When one or more predetermined dormant criteria are met, the method proceeds to the operation 440. Otherwise, the method goes back to the operation 420. For example, the predetermined dormant criteria may be configured to be that the uplink traffic rate is lower than a predetermined value, the downlink traffic rate is lower than a predetermined value, the downlink traffic in the queue is lower than a predetermined value, the buffer status reported by the communication device is lower than a predetermined value, etc.

In the operation 440, the control circuit 129 of the communication station 120 may configure the baseband processing circuit 125, the RF processing circuit 123 and the antenna 121 to transmit one or more suitable signaling messages to inform the communication device(s) to perform the dynamic radio dormant mechanism. The communication station 120 may transmit the signaling message by utilizing the media access control (MAC) message, the radio resource control (RRC) configuration message, the RRC reconfiguration message, the physical downlink control channel (PDCCH), etc.

For example, when the signaling message is transmitted in the PDCCH, a predetermined radio network temporary identifier (RNTI) may be designated to inform the communication device to perform the dynamic radio dormant mechanism. The communication station 120 may utilize the RNTI to inform all or part of the serving communication devices to perform the dynamic radio dormant mechanism. In other embodiments, the communication devices may be grouped into several dormant groups and the communication station 120 may transmit a specific RNTI to inform a dormant group to perform the dynamic radio dormant mechanism.

In the operation 450, the communication station 120 and the communication device perform the dynamic radio dormant mechanism. When performing the dynamic radio dormant mechanism, the communication device may enter the power saving mode in which the communication device does not transmit the uplink traffic in the uplink subframe(s) configured to be dormant and/or does not receive the downlink traffic in the downlink subframe(s) configured to be dormant. For example, the control circuit 159 of the communication device 150 may configure at least part of the RF processing circuit 153 and/or at least part of the baseband processing circuit 155 to enter the power saving mode for not transmitting the uplink traffic or not receiving the downlink traffic in the subframe(s) configured to be dormant.

Moreover, the communication station 120 does not receive the uplink traffic in the uplink subframe(s) configured to be dormant and/or does not transmit the downlink traffic in the downlink subframe(s) configured to be dormant. For example, the control circuit 129 of the communication station 120 may configure at least part of the RF processing circuit 123 and/or at least part of the baseband processing circuit 125 to enter the power saving mode for not transmitting the downlink traffic or not receiving the uplink traffic in the subframe(s) configured to be dormant.

When a predetermined dormant criterion is met, the control circuit 129 of the communication station 120 may also adjust the configuration of the dynamic radio dormant mechanism. For example, when the downlink traffic further decreases, the control circuit 129 of the communication station 120 may configure more downlink subframes to be dormant. When the downlink traffic increases, the communication station 120 may configure fewer downlink subframe(s) to be dormant for increasing the downlink bandwidth, or even stop performing the dynamic radio dormant mechanism.

The changing of the configuration of the dynamic radio dormant mechanism may be applied to multiple communication devices at once or individually to each communication device. Moreover, the changing of the configuration of the dynamic radio dormant mechanism may utilize the SIB (which need a longer time) or other signaling messages for having a rapid response time when a predetermined dormant criterion is met.

Because the communication station 120 may serve both communication devices supporting the dynamic radio dormant mechanism and legacy communication devices which do not support the dynamic radio dormant mechanism, the communication station 120 may take further measures for dealing with the compatibility issue. For example, the hybrid automatic repeat request (HARQ) feedback signaling (e.g., acknowledgement and negative acknowledgement) may be configured to be transmitted only in the static subframes. The HARQ timing may be adjusted according to the configuration of the dynamic radio dormant mechanism. The discontinuous reception timer may be configured to calculate only the static subframes. The physical random access channel (PRACH) resource may be configured to only in the static uplink subframes. Moreover, the communication station 120 may apply these measures to only the legacy communication devices or to both the communication devices supporting the dynamic radio dormant mechanism and the legacy communication devices. Therefore, the ambiguity of the configuration may be reduced and the backward compatibility may be improved.

Moreover, in order to improve the performance of the communication system 100, the communication station 120 may also interchange the information of the dynamic radio dormant mechanism with neighboring communication station(s) (e.g., the communication station 130 in this embodiment). For example, the control circuit 129 of the communication station 120 may configure the transceiving circuit 127 to transmit a signaling message through the network 140 to the communication station 130 to inform the communication station 130 whether the communication station 120 is performing the dynamic radio dormant mechanism, the configuration of the dynamic radio dormant mechanism, etc. The signaling message may comprise one or more bits to indicate whether the dynamic radio dormant mechanism is enabled, one or more bits indicating the level of the dormant status (e.g., high or low according to the number of subframe(s) configured to be dormant), one or more bits indicating the subframe(s) configured to be dormant, one or more bits indicating the subframe-set(s) configured to be dormant, etc.

When the communication station 130 receives the signaling message from the communication station 120, the communication station 130 may adjust the interference mitigation strategy because the interference from the communication station 120 is reduced when the communication station 120 performs the dynamic radio dormant mechanism.

For example, the communication station 130 may take into consideration that the interference from the communication station 120 is reduced and decrease the transmission power in the duration of the subframe(s) configured to be dormant accordingly. The communication station 130 may adjust the interference measurement result by taking into consideration that the interference from the communication station 120 is reduced and label the interference measurement result is measured under a reduced inter-cell interference condition.

Moreover, the communication station 130 may adjust the radio resource allocation policy accordingly. For example, the communication station 130 may schedule more uplink and/or downlink communications in the duration in which the communication station 120 configures the subframes to be dormant.

Of course, when the communication station 120 receives such signaling messages from the neighboring communication station(s), the communication station 120 may also adjust the interference mitigation strategy described above.

Furthermore, the communication station 120 may also interchange the information of the dynamic radio dormant mechanism with the network controlling entity 110 to enhance the performance of the communication system 100. For example, the control circuit 129 of the communication station 120 may configure the transceiving circuit 127 to transmit a signaling message through the network 140 to the network controlling entity 110 to indicate whether the communication station 120 is performing the dynamic radio dormant mechanism, the configuration of the dynamic radio dormant mechanism, etc.

On the other hand, the network controlling entity 110 may also configure the communication station 120 to operate in one or more specific configurations of the dynamic radio dormant mechanism. For example, the network controlling entity 110 may configure the communication station 120 to operate in the designated configuration of the dynamic radio dormant mechanism, or transmit one or more suggested configurations of the dynamic radio dormant mechanism for the communication station 120 to choose a suitable one.

In the operations 420 and 430, the control circuit 129 of the communication station 120 collects traffic information and determines whether the dynamic radio dormant mechanism should be utilized according to the collected traffic information. In other embodiment, the control circuit 129 of the communication station 120 may determines whether the dynamic radio dormant mechanism should be utilized according to other predetermined dormant criteria, e.g., the energy policy, the energy status and the interference policy. The energy policy and the interference policy may be prebuilt in the memory (not shown in FIG. 2) of the communication station 120. In other embodiment, the communication station 120 may also collect the traffic information, the energy policy and the interference policy from the network controlling entity 110 for determining whether one or more predetermined dormant criteria are met.

For example, when the communication station 120 tries to reduce the energy consumption, the control circuit 129 of the communication station 120 may determines the dynamic radio dormant mechanism should be utilized. When the communication station 120 tries to reduce interference to neighboring communication stations and/or avoid communications in the subframe(s) with more interference from the neighboring communication stations, the control circuit 129 of the communication station 120 may also determines the dynamic radio dormant mechanism should be utilized. Moreover, the control circuit 129 of the communication station 120 may adopt multiple predetermined dormant criteria. For example, when the traffic information meets a predetermined dormant criterion and the energy policy is set to a power conserving mode, the communication station 120 determines the dynamic radio dormant mechanism should be utilized.

Figure 5:
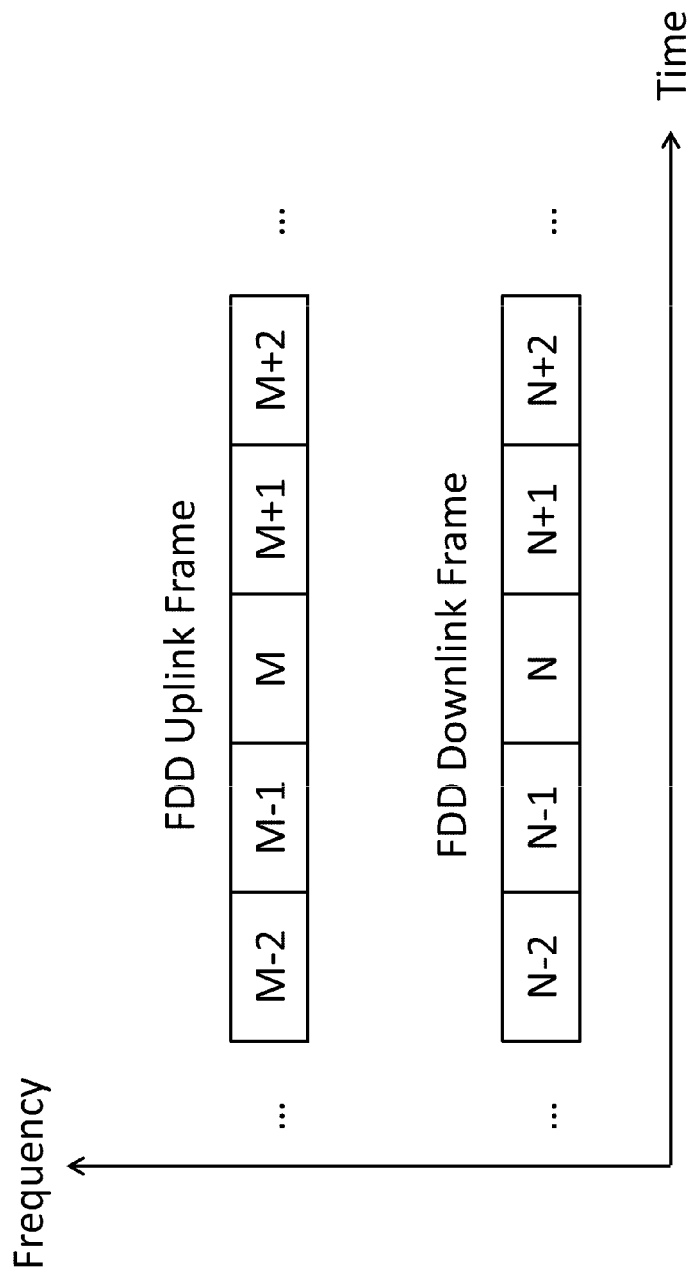
FIG. 5 shows a simplified schematic diagram of the uplink-downlink resource assignments in a frequency division duplex communication system according to one embodiment of the present disclosure.

FIG. 5 shows a simplified schematic diagram of the UL-DL resource assignments in a frequency division duplex (FDD) communication system according to one embodiment of the present disclosure.

When the communication system 100 operates in the FDD mode, the frames transmitted between the communication station and the communication device are illustrated in the upper part of FIG. 5. Although the uplink frames and the downlink frames are illustrated to he transmitted in different frequencies, the drawing is simply utilized for clear explanation. In some embodiment, the frequencies for transmitting the uplink frames and the downlink frames may be partially or completely overlapped.

The uplink frame is utilized for the communication device to transmit the uplink traffic to the communication station. The downlink frame is utilized for the communication station to transmit the downlink traffic to the communication device. Furthermore, when utilizing the dynamic radio dormant mechanism, the frames may be categorized into two types, i.e., the configurable frames and the static frames.

The configurable frames may be configured to be dormant or non-dormant. The configurable frames comprise the configurable uplink frames and the configurable downlink frames. When a configurable uplink frame is configured to be dormant, the communication station does not receive the uplink traffic in the configurable uplink frame. When a configurable uplink frame is configured to be non-dormant, it is utilized as a normal uplink frame. When a configurable downlink frame is configured to be dormant, the communication station does not transmit the downlink traffic in the configurable downlink frame. When a configurable downlink frame is configured to be non-dormant, it is utilized as a normal downlink frame.

The static frames comprise the static uplink frames and the static downlink frames. A static uplink frame may only be configured to be non-dormant so that the communication station always may receive the uplink traffic in the static uplink frame. A static downlink frame may only be configured to be non-dormant so that the communication station always may transmit the downlink traffic in the static downlink frame.

When there is less uplink traffic between the communication station 120 and the serving communication devices, one or more uplink frames may be configured to be dormant. When there is less downlink traffic between the communication station 120 and the serving communication devices, one or more downlink frames may be configured to be dormant. The communication station may configure only the downlink frame(s) to be dormant, only the uplink frame(s) to be dormant, or both the uplink frame(s) and the downlink frame(s) to be dormant according to different design considerations.

When the communication system 100 operates in the FDD mode, the communication method in FIG. 4 still may be applied for the communication station 120 and the communication devices to perform the dynamic radio dormant mechanism in the FDD mode In the operation 410, the communication station 120 and the communication device perform the association process. The communication station 120 and the communication device may exchange the capability of supporting the dynamic radio dormant mechanism in the association process. For example, the control circuit 129 of the communication station 120 may configure the baseband processing circuit 125, the RF processing circuit 123 and the antenna 121 to periodically transmit the capability to support the dynamic radio dormant mechanism by utilizing the SIB. The SIB may comprise an indicator to indicate whether the communication station supports the dynamic radio dormant mechanism, an indicator to indicator whether the dynamic radio dormant mechanism is currently enabled, an indicator to indicator whether the configuration of the dynamic radio dormant mechanism is to be changed, etc. In other embodiment, the SIB may comprise a pointer pointed to the detailed configuration of the dynamic radio dormant mechanism (e.g., the detailed configuration may be located in another SIB). The detailed configuration may comprise the frame(s) configured to be dormant, a mapping table indicating the frame(s) configured to be dormant, etc. The control circuit of the communication device may also configure the baseband processing circuit, the RF processing circuit and the antenna to report its capability of supporting the dynamic radio dormant mechanism to the communication station 120 in the association process.

In the operation 420, the control circuit 129 of the communication station 120 collects traffic information by utilizing the antenna 121, the RF processing circuit 123 and the baseband processing circuit 125 for determining whether the dynamic radio dormant mechanism should be utilized. The traffic information may comprise the traffic status between the communication station 120 and the serving communication devices, the interference condition from the neighboring communication station(s) (e.g., the communication station 130 in this embodiment), etc. The traffic status may comprise the uplink traffic rate, the downlink traffic rate, the downlink traffic in the queue, the buffer status reported by the communication devices.

In the operation 430, the control circuit 129 of the communication station 120 determines whether the dynamic radio dormant mechanism should be utilized according to the collected traffic information. When one or more predetermined dormant criteria are met, the method proceeds to the operation 440. Otherwise, the method goes back to the operation 420. For example, the predetermined dormant criteria may be configured to be that the uplink traffic rate is lower than a predetermined value, the downlink traffic rate is lower than a predetermined value, the downlink traffic in the queue is lower than a predetermined value, the buffer status reported by the communication device is lower than a predetermined value, etc.

In the operation 440, the control circuit 129 of the communication station 120 may configure the baseband processing circuit 125, the RF processing circuit 123 and the antenna 121 to transmit one or more suitable signaling messages to inform the communication device(s) to perform the dynamic radio dormant mechanism. The communication station 120 may transmit the signaling message by utilizing the MAC message, the RRC configuration message, the RRC reconfiguration message, the PDCCH, etc.

For example, when the signaling message is transmitted in the PDCCH, a predetermined RNTI may be designated to inform the communication device to perform the dynamic radio dormant mechanism. The communication station 120 may utilize the RNTI to inform all or part of the serving communication devices to perform the dynamic radio dormant mechanism. In other embodiments, the communication devices may be grouped into several dormant groups and the communication station 120 may transmit a specific RNTI to inform a dormant group to perform the dynamic radio dormant mechanism.

In the operation 450, the communication station 120 and the communication device perform the dynamic radio dormant mechanism. When performing the dynamic radio dormant mechanism, the communication device may enter the power saving mode in which the communication device does not transmit the uplink traffic in the uplink frame(s) configured to be dormant and/or does not receive the downlink traffic in the downlink frame(s) configured to be dormant. For example, the control circuit 159 of the communication device 150 may configure at least part of the RF processing circuit 153 and/or at least part of the baseband processing circuit 155 to enter the power saving mode for not transmitting the uplink traffic or not receiving the downlink traffic in the frame(s) configured to be dormant.

Moreover, the communication station 120 does not receive the uplink traffic in the uplink frame(s) configured to be dormant and/or does not transmit the downlink traffic in the downlink frame(s) configured to be dormant. For example, the control circuit 129 of the communication station 120 may configure at least part of the RF processing circuit 123 and/or at least part of the baseband processing circuit 125 to enter the power saving mode for not transmitting the downlink traffic or not receiving the uplink traffic in the frame(s) configured to be dormant.

Furthermore, in some embodiments in the FDD mode, the communication station 120 may have two RF processing circuits respectively for transmission and reception. The control circuit 129 of the communication station 120 may respectively configure the RF processing circuit for transmission and the RF processing circuit reception into the power saving mode according to the frame(s) configured to be dormant.

When a predetermined dormant criterion is met, the control circuit 129 of the communication station 120 may also adjust the configuration of the dynamic radio dormant mechanism. For example, when the downlink traffic further decreases, the control circuit 129 of the communication station 120 may configure more downlink frames to be dormant. When the downlink traffic increases, the communication station 120 may configure fewer downlink frame(s) to be dormant for increasing the downlink bandwidth, or even stop performing the dynamic radio dormant mechanism.

The changing of the configuration of the dynamic radio dormant mechanism may be applied to multiple communication devices at once or individually to each communication device. Moreover, the changing of the configuration of the dynamic radio dormant mechanism may utilize the SIB (which need a longer time) or other signaling messages for having a rapid response time when a predetermined dormant criterion is met.

Because the communication station 120 may serve both communication devices supporting the dynamic radio dormant mechanism and legacy communication devices which do not support the dynamic radio dormant mechanism, the communication station 120 may take further measures for dealing with the compatibility issue. For example, the HARQ feedback signaling (e.g., acknowledgement and negative acknowledgement) may be configured to be transmitted only in the static frames. The HARQ liming may be adjusted according to the configuration of the dynamic radio dormant mechanism. The discontinuous reception timer may be configured to calculate only the static frames. The PRACH resource may be configured to only in the static uplink frames. Moreover, the communication station 120 may apply these measures to only the legacy communication devices or to both the communication devices supporting the dynamic radio dormant mechanism and the legacy communication devices. Therefore, the ambiguity of the configuration may be reduced and the backward compatibility may be improved.

Moreover, in order to improve the performance of the communication system 100, the communication station 120 may also interchange the information of the dynamic radio dormant mechanism with neighboring communication station(s) (e.g., the communication station 130 in this embodiment). For example, the control circuit 129 of the communication station 120 may configure the transceiving circuit 127 to transmit a signaling message through the network 140 to the communication station 130 to inform the communication station 130 whether the communication station 120 is performing the dynamic radio dormant mechanism, the configuration of the dynamic radio dormant mechanism, etc. The signaling message may comprise one or more bits to indicate whether the dynamic radio dormant mechanism is enabled, one or more bits indicating the level of the dormant status (e.g., high or low according to the number of frame(s) configured to be dormant), one or more bits indicating the frame(s) configured to be dormant, etc.

When the communication station 130 receives the signaling message from the communication station 120, the communication station 130 may adjust the interference mitigation strategy because the interference from the communication station 120 is reduced when the communication station 120 performs the dynamic radio dormant mechanism.

For example, the communication station 130 may take into consideration that the interference from the communication station 120 is reduced and decrease the transmission power in the duration of the frame(s) configured to be dormant accordingly. The communication station 130 may adjust the interference measurement result by taking into consideration that the interference from the communication station 120 is reduced and label the interference measurement result is measured under a reduced inter-cell interference condition.

Moreover, the communication station 130 may adjust the radio resource allocation policy accordingly. For example, the communication station 130 may schedule more uplink and/or downlink communications in the duration in which the communication station 120 configures the frames to be dormant.

Of course, when the communication station 120 receives such signaling messages from the neighboring communication station(s), the communication station 120 may also adjust the interference mitigation strategy described above.

Furthermore, the communication station 120 may also interchange the information of the dynamic radio dormant mechanism with the network controlling entity 110 to enhance the performance of the communication system. For example, the control circuit 129 of the communication station 120 may configure the transceiving circuit 127 to transmit a signaling message through the network 140 to the network controlling entity 110 to indicate whether the communication station 120 is performing the dynamic radio dormant mechanism, the configuration of the dynamic radio dormant mechanism, etc.

On the other hand, the network controlling entity 110 may also configure the communication station 120 to operate in one or more specific configurations of the dynamic radio dormant mechanism. For example, the network controlling entity 110 may configure the communication station 120 to operate in the designated configuration of the dynamic radio dormant mechanism, or transmit one or more suggested configurations of the dynamic radio dormant mechanism for the communication station 120 to choose a suitable one.

In the operations 420 and 430, the control circuit 129 of the communication station 120 collects traffic information and determines whether the dynamic radio dormant mechanism should be utilized according to the collected traffic information. In other embodiment, the control circuit 129 of the communication station 120 may determines whether the dynamic radio dormant mechanism should be utilized according to other predetermined dormant criteria, e.g., the energy policy, the energy status and the interference policy. The energy policy and the interference policy may be prebuilt in the memory (not shown in FIG. 2) of the communication station 120. In other embodiment, the communication station 120 may also collect the traffic information, the energy policy and the interference policy from the network controlling entity 110 for determining whether one or more predetermined dormant criteria are met.

For example, when the communication station 120 tries to reduce the energy consumption, the control circuit 129 of the communication station 120 may determines the dynamic radio dormant mechanism should be utilized. When the communication station 120 tries to reduce interference to neighboring communication stations and/or avoid communications in the frames with more interference from the neighboring communication stations, the control circuit 129 of the communication station 120 may also determines the dynamic radio dormant mechanism should be utilized. Moreover, the control circuit 129 of the communication station 120 may adopt multiple predetermined dormant criteria. For example, when the traffic information meets a predetermined dormant criterion and the energy policy is set to a power conserving mode, the communication station 120 determines the dynamic radio dormant mechanism should be utilized.

In the above embodiment, the communication method in FIG. 4 is explained by utilizing the simplified structures of the components in FIG. 2. In other embodiments, the communication method in FIG. 4 may also be performed by utilizing other suitable combinations of hardware, firmware and software. For example, the RF processing circuit 123, the baseband processing circuit 125, the transceiving circuit 127 and the control circuit 129 may be realized with one or more integrated circuit elements and discrete circuit elements. A signal processor may be utilized to execute firmware and/or software to perform one or more operations of the baseband processing circuit 125, the transceiving circuit 127 and the control circuit 129 for performing the communication method in FIG. 4. In other embodiments, the communication method in FIG. 4 may also be performed by utilizing one or more dedicated hardware circuits, each of which performs one or more operations of the communication method in FIG. 4. In other embodiments, one or more signal processors executing firmware and/or software and one or more dedicated hardware circuits may be collectively utilized to perform the operations of the communication method in FIG. 4.

In the above embodiments, the communication station may dynamically configure the TDD subframe and the FDD frame to be dormant according to the traffic information, the energy policy, the interference policy, etc. Unnecessary signal transmissions between the communication station and the communication devices may be reduced. Therefore, the power consumption of the communication station and the communication device may both be reduced. Moreover, the interference between neighboring communication stations may be also reduced.

Furthermore, the communication station may dynamically configure the TDD subframe and the FDD frame to be dormant instead of completely turning off the communication station. The communication performance of the communication system may also be enhanced.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A communication method for a communication station to transmit time division duplex (TDD) frames wherein each TDD frames comprises a plurality of subframes, comprising:
    transmitting a capability of supporting a dynamic radio dormant mechanism to one or more communication devices;
    collecting at least one of a traffic information, an energy policy, an energy status and an interference policy for determining whether one or more predetermined dormant criteria are met; and transmitting one or more signaling messages to the one or more communication devices to perform the dynamic radio dormant mechanism which comprises at least one of the following:
stopping a transmission of a downlink traffic in a downlink subframe configured to be dormant; and
stopping a reception of an uplink traffic in an uplink subframe configured to be dormant.

2. The communication method of claim 1, wherein the capability of supporting the dynamic radio dormant mechanism is transmitted by utilizing a system information block.

3. The communication method of claim 1, wherein the traffic information comprises an uplink traffic rate, a downlink traffic rate, a downlink traffic in a queue of the communication station, and one or more buffer statuses reported by the one or more communication devices.

4. The communication method of claim 1, the one or more signaling messages are transmitted by utilizing at least one of a media access control message, a radio resource control configuration message, a radio resource control reconfiguration message, and a physical downlink control channel message.

5. The communication method of claim 1, further comprising at least one of:
adjusting a hybrid automatic repeat request timing;
adjusting a discontinuous reception timer to calculate only subframes not configured to be dormant; and
configuring a physical random access channel resource to be only in a subframe not configured to be dormant.

6. The communication method of claim 1, further comprising:
transmitting an information of the dynamic radio claimant mechanism to a neighboring communication station;
wherein the information of the dynamic radio dormant mechanism comprises at least one of one or more bits to indicate whether the dynamic radio dormant mechanism is enabled, one or more bits indicating the level of the dormant status, one or more bits indicating a subframe configured to be dormant, and one or more bits indicating a subframe-set configured to be dormant.

7. The communication method of claim 1, further comprising:
receiving an information of the dynamic radio dormant mechanism from a neighboring communication station;
wherein the information of the dynamic radio dormant mechanism comprises at least one of one or more bits to indicate whether the dynamic radio dormant mechanism is enabled, one or more bits indicating the level of the dormant status, one or more bits indicating a subframe configured to be dormant, and one or more bits indicating a subframe-set configured to be dormant.

8. The communication method of claim 7, further comprising at least one of:
reducing a transmission power of the communication station;
adjusting an interference measurement result;
labelling the interference measurement result is measured under a reduced inter-cell interference condition; and
scheduling more communications in a duration in which the neighboring communication station configures a subframe to be dormant.

9. The communication method of claim 1, further comprising:
transmitting an information of the dynamic radio dormant mechanism to a network controlling entity;
wherein the information of the dynamic radio dormant mechanism indicates at least one of whether the communication station is performing the dynamic radio dormant mechanism and a configuration of the dynamic radio dormant mechanism.

10. The communication method of claim 1, further comprising:
receiving one or more configurations of the dynamic dormant mechanism from a network controlling entity; and
configuring a subframe to be dormant according to at least one of the one or more configurations of the dynamic dormant mechanism.

11. A communication method for a communication station to transmit frequency division duplex frames, comprising:
transmitting a capability of supporting a dynamic radio dormant mechanism to one or more communication devices;
collecting at least one of a traffic information, an energy policy, an energy status and an interference policy for determining whether one or more predetermined dormant criteria are met; and
transmitting one or more signaling messages to the one or more communication devices to perform the dynamic radio dormant mechanism which comprises at least one of the following:
stopping a transmission of a downlink traffic in a downlink frame configured to be dormant; and
stopping a reception of an uplink traffic in an uplink frame configured to be dormant.

12. The communication method of claim 11, wherein the capability of supporting the dynamic radio dormant mechanism is transmitted by utilizing a system information block.

13. The communication method of claim 11, wherein the traffic information comprises an uplink traffic rate, a downlink traffic rate, a downlink traffic in a queue of the communication station, and one or more buffer statuses reported by the one or more communication devices.

14. The communication method of claim 11, the one or more signaling messages are transmitted by utilizing at least one of a media access control message, a radio resource control configuration message, a radio resource control reconfiguration message, and a physical downlink control channel message.

15. The communication method of claim 11, further comprising at least one of:
adjusting a hybrid automatic repeat request timing;
adjusting a discontinuous reception timer to calculate only frames not configured to be dormant; and
configuring a physical random access channel resource to be only in a frame not configured to be dormant.

16. The communication method of claim 11, further comprising:
transmitting an information of the dynamic radio don cant mechanism to a neighboring communication station;
wherein the information of the dynamic radio dormant mechanism comprises at least one of one or more bits to indicate whether the dynamic radio dormant mechanism is enabled, one or more bits indicating the level of the dormant status, and one or more bits indicating a frame configured to be dormant.

17. The communication method of claim 11, further comprising:
receiving an information of the dynamic radio dormant mechanism from a neighboring communication station;
wherein the info information of the dynamic radio dormant mechanism comprises at least one of one or more bits to indicate whether the dynamic radio dormant mechanism is enabled, one or more bits indicating the level of the dormant status, and one or more bits indicating a frame configured to be dormant.

18. The communication method of claim 17, further comprising at least one of:

reducing a transmission power of the communication station;

adjusting an interference measurement result;

labelling the interference measurement result is measured under a reduced inter-cell interference condition; and scheduling more communications in a duration in which the neighboring communication station configures a frame to be dormant.

19. The communication method of claim 11, further comprising:

transmitting an information of the dynamic radio dormant mechanism to a network controlling entity;

wherein the information of the dynamic radio dormant mechanism indicates at least one of whether the communication station is performing the dynamic radio dormant mechanism and a configuration of the dynamic radio dormant mechanism.

20. The communication method of claim 11, further comprising:

receiving one or more configurations of the dynamic dormant mechanism from a network controlling entity; and configuring a frame to be dormant according to at least one of the one or more configurations of the dynamic dormant mechanism.

* * * * *